United States Patent
Davis et al.

(10) Patent No.: US 7,219,175 B1
(45) Date of Patent: May 15, 2007

(54) METHOD AND SYSTEM FOR IMPROVING THE LATENCY IN A DATA TRANSMISSION SYSTEM

(75) Inventors: Almir Davis, Quincy, MA (US); David Iwatsuki, Newton, MA (US); Matthew Sullivan, Holden, MA (US)

(73) Assignee: EMC Corporation, Hopkinton, MA (US)

( * ) Notice: Subject to any disclaimer, the term of this patent is extended or adjusted under 35 U.S.C. 154(b) by 197 days.

(21) Appl. No.: 11/095,099

(22) Filed: Mar. 31, 2005

(51) Int. Cl.
*G06F 13/42* (2006.01)

(52) U.S. Cl. .................. 710/105; 710/52; 710/310

(58) Field of Classification Search ............... 710/29, 710/33, 52, 53, 56, 57, 59, 60, 105–106, 710/305, 306, 310, 313, 316
See application file for complete search history.

(56) References Cited

U.S. PATENT DOCUMENTS

| | | | |
|---|---|---|---|
| 6,026,451 A * | 2/2000 | Sreenivas ..................... | 710/39 |
| 6,715,055 B1 * | 3/2004 | Hughes ....................... | 711/170 |
| 6,760,793 B2 * | 7/2004 | Kelley et al. ................. | 710/52 |
| 6,839,784 B1 * | 1/2005 | Ennis et al. ................. | 710/240 |
| 2004/0010612 A1 * | 1/2004 | Pandya ....................... | 709/230 |
| 2004/0151197 A1 * | 8/2004 | Hui ............................. | 370/412 |
| 2005/0055489 A1 * | 3/2005 | Elliott ........................ | 710/310 |
| 2005/0238038 A1 * | 10/2005 | Keller et al. ................. | 370/429 |
| 2006/0173970 A1 * | 8/2006 | Pope et al. .................. | 709/216 |
| 2006/0230210 A1 * | 10/2006 | Stanton ....................... | 710/301 |
| 2006/0230215 A1 * | 10/2006 | Woodral ..................... | 710/310 |
| 2006/0242354 A1 * | 10/2006 | Johnsen et al. ............. | 710/316 |
| 2006/0256879 A1 * | 11/2006 | Szczepanek et al. ........ | 375/246 |
| 2007/0011366 A1 * | 1/2007 | Morishita et al. ............. | 710/36 |

OTHER PUBLICATIONS

The Effective Buffer Architecture for Data Link Layer of PCI Express, IEEE 2004.*
Definition of OSI Model from Wikipedia.*

* cited by examiner

*Primary Examiner*—Khanh Dang
(74) *Attorney, Agent, or Firm*—Krishnendu Gupta; Scott A. Ouellette (57) ABSTRACT

A system for transferring packets between a packet transfer core and an application layer device over an application layer interface includes a buffer system disposed in the packet transfer core having an input for receiving packets from a packet source; an output for transferring packets to the application layer interface; a buffer device having an input coupled to the input of the buffer system and an output; a selection device having a first input coupled to the output of the buffer device, a control input and an output coupled to the output of the buffer system; and a bypass path coupled between the input of the buffer system and a second input of the selection device. The control input of the selection device receives a first wait signal from the application layer device which is not asserted in a first mode of operation and asserted in a second mode of operation. In the first mode of operation, packets are transferred from the input of the buffer system to the output of the buffer system via the bypass path and, in the second mode of operation, packets are transferred from the input of the buffer system to the buffer device, and are store in the buffer device without being transferred to the output of the buffer system until the first wait signal from the application layer device is deasserted.

14 Claims, 8 Drawing Sheets

METHOD AND SYSTEM FOR IMPROVING THE LATENCY IN A DATA TRANSMISSION SYSTEM

FIELD OF THE INVENTION

The present invention is directed generally to a method and system for processing packet transfers and more particularly to a method and system for improving latency in the transmission of packet transfers and for throttling the transmission of data packets to the application from the transaction layer of a PCI Express core.

BACKGROUND OF THE INVENTION

Figure 1:
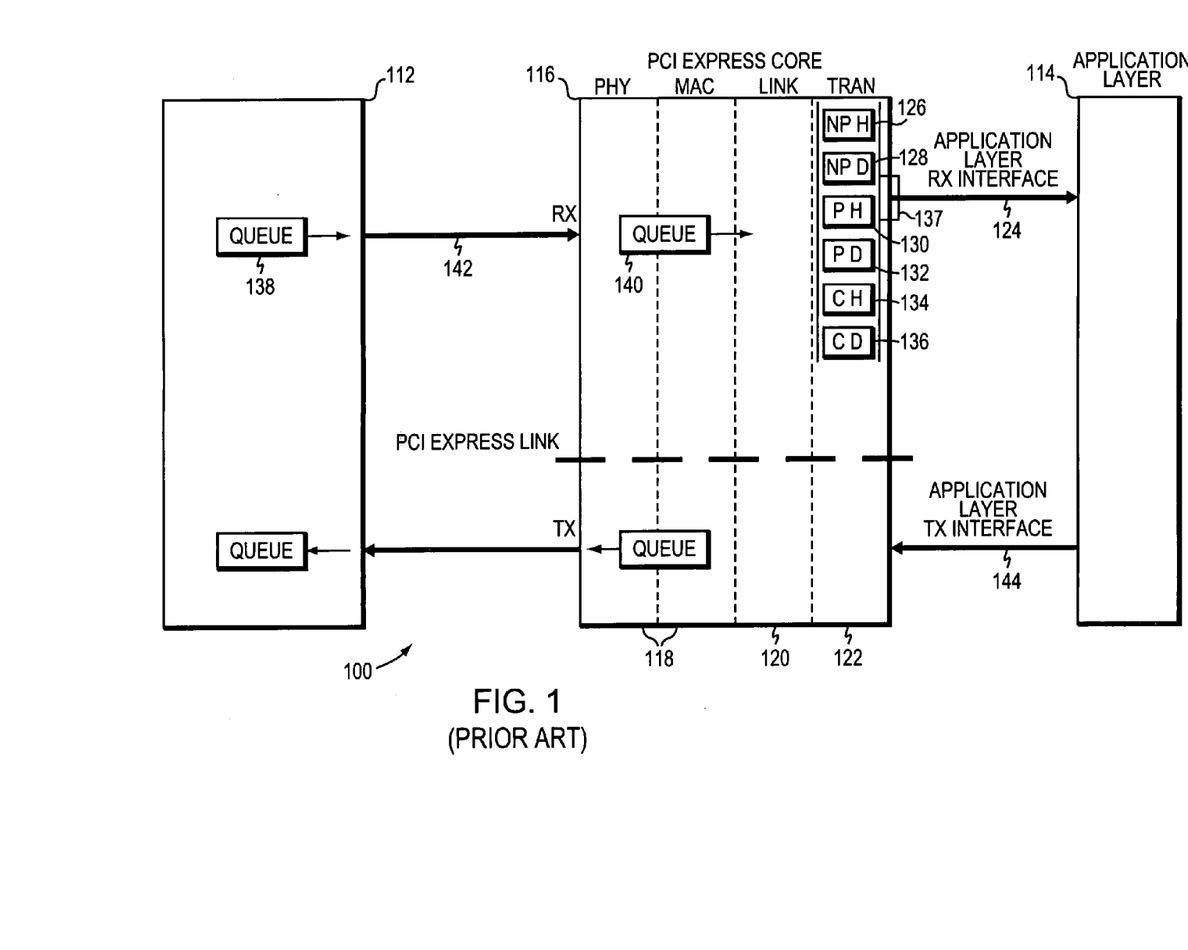
FIG. 1 is a schematic diagram of a PCI Express data transfer system.

PCI Express is the next generation of PCI (Peripheral Component Interconnect), which is a standard interconnection system that enables the transfer of data between a host device 112 and an attached application layer device 114 of a data transfer system 100, FIG. 1. The PCI Express protocol is implemented using PCI Express core 116. PCI Express core 116 is a hardware controller used to identify and resolve the PCI Express protocol layers: the physical/mac layer 118, the link layer 120 and the transaction layer 122. The data is delivered through an application layer interface 124 to the attached application layer device 114.

PCI Express protocol is a very fast, bandwidth rich protocol, enabling a variety of applications to be implemented through a PCI Express link. Application layer devices 114 can include bandwidth-consuming applications, such as file transfers and multimedia files, latency-sensitive applications, such as real-time video and voice streaming applications, and applications requiring both high bandwidth and low latency, such as video conferencing.

The application layer interface 124 connects the PCI Express core 116 to the application layer device 114. The application layer device 114 may be a single, common address/data bus having a few control signals to insure errorless handshakes between the host 114 and any type of application. For example, the application layer device may be a switch or router connected between the PCI Express core 116 and a number of clients that communicate with the host 112. The application layer device in such a case routes incoming packets to the appropriate client (not shown).

The application layer interface 124 is driven by the transaction layer architecture 122 of the PCI Express core 116. The transaction layer architecture 122 of the PCI Express core 116 typically consists of six FIFO buffers: a non-posted header buffer "NP H" 126, a non-posted data buffer "NP D" 128, a posted header buffer "P H" 130, a posted data buffer "P D" 132, a completion header buffer "C H" 134 and a completion data buffer "C D" 136. The six buffers 126–136 are needed to implement the PCI Express reordering rules for three different types of transfers: 1) posted transfers (typically memory write transfers); 2) non-posted transfers (typically memory read transfers); and 3) completion transfers (also called "read response" transfers). The PCI Express reordering rules are set by the PCI Express Standard and described in the PCI Express Base Specification.

SUMMARY OF THE INVENTION

The present invention is directed to a data packet transfer system including a buffer device having a bypass data path for enabling data transfers to be received by the application layer device from the transaction layer of a PCI Express core without delay when the application is able to receive the data transfers and for storing data transfers in a buffer in the transaction layer when the application layer device is unable to receive the data transfers. The system also includes a completion transfer buffer device which enables the application layer device to throttle the transmission of completion transfers from the transaction layer to the application layer devices. Since the application layer devices typically run at speeds slower than the operating speed of the PCI Express core, the completion transfer buffer device enables the application devices to slow the completion transfers to a speed at which the application layer devices can receive the transfers without losing data.

BRIEF DESCRIPTION OF THE DRAWINGS

These and other features of the invention will become more readily apparent from the following detailed description when read together with the accompanying drawings, in which.

DETAILED DESCRIPTION

The present invention solves the low bandwidth/high latency problem described above by providing a buffering scheme for completion transfers which enables the application layer device to throttle the transmission of completion transfers from the transaction layer of the PCI Express core to the application layer devices. The ability of the application layer devices to throttle the transmission of completion transfers enables the transaction layer and application layer devices to be running at different clock speeds, typically with the transaction layer running at a faster speed than the application layer devices. The completion transfers can be buffered in the application layer to enable the application layer devices to receive the completion transfers at a slower speed than the transaction layer is transmitting the completion transfers.

The invention also improves the latency of the data transmission system by providing a data path scheme in which, in a first mode of operation, data transfers are transmitted from the transaction layer to the application layer directly without buffering and, in a second mode of operation, data transfers are buffered for as long as the receiving application layer device requires that they be buffered. When the application layer device is ready to resume receiving the data transfers, the data is "pushed" out of the buffer to the application layer device.

Figure 2:
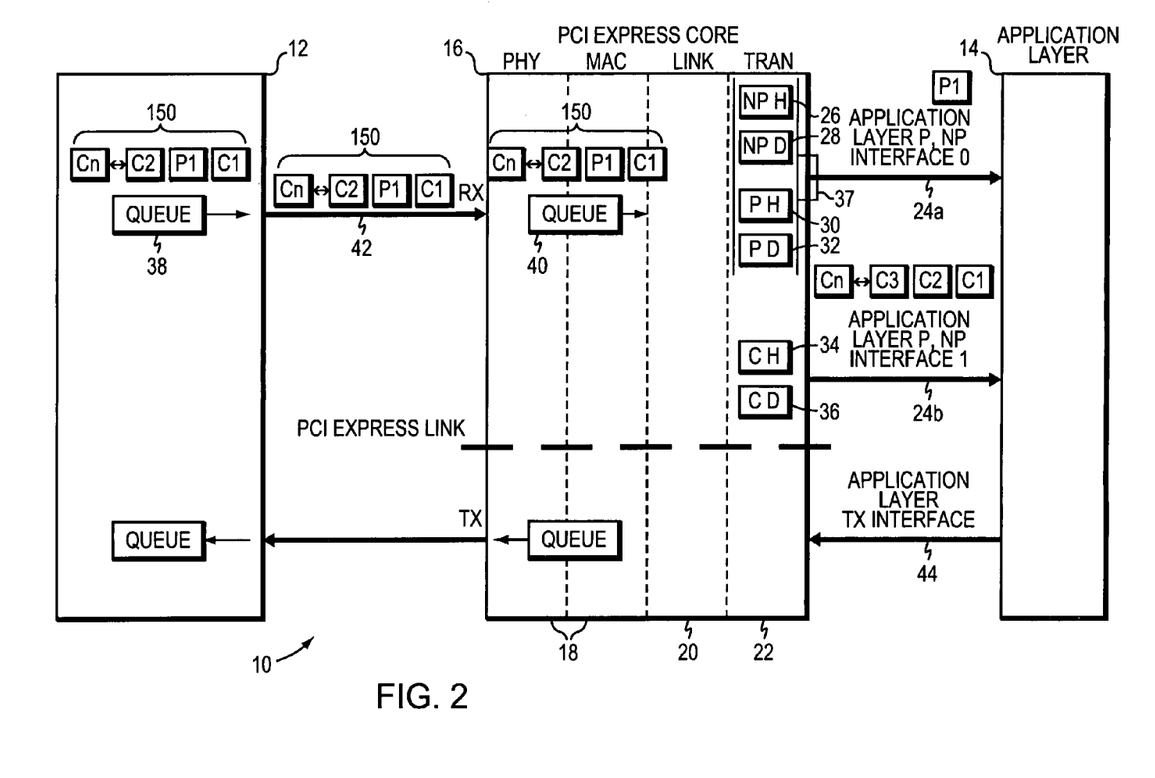
FIG. 2 is a schematic diagram of a PCI Express data transfer system having a split application layer interface.

As shown in FIG. 2, which is a schematic diagram of the data transfer system 10 of the present invention, a packet sequence 150: C1, P1, C2, . . . Cn is transmitted from the output queue 38 of the host device 12, across the PCI Express link 42 to into the input queue 40 of the PCI Express core 16. Each packet of the sequence is then input to its respective transaction layer buffer 26–36, depending on whether the packet is a non-posted data transfer packet, in which case the packet header is input to buffer NP H 26, and the packet data is input to buffer NP D 28; a posted data transfer packet, in which case the packet header is input to buffer P H 30, and the packet data is input to buffer P D 32; or a completion packet, in which case the packet header is input to buffer C H 34, and the packet data is input to buffer C D 36.

The transaction layer 22 includes an arbiter 37 that only handles the posted and non-posted request packets. The posted and non-posted request packets are reordered according to the PCI Express Standard and are then transmitted to the application layer device 14 over application layer interface 24a. The completion packets are not arbitrated and may be directly transmitted from the buffers 34, 36 to the application layer device 14 over the application layer interface 24b in the manner described below. As shown in FIG. 2, after each packet of the sequence 150 is input to its respective transaction layer buffer 26–36, the completion packets C1, C2, . . . , Cn may be directly transmitted to the application layer device 14 over application layer interface 24b without arbitration, and the posted request packet P1 is transmitted to the application layer device 14 over application layer interface 24a after arbitration in arbiter 37. Since the posted packet P1 is not reordered behind the completion packets C1, C2, . . . , Cn, it can be relatively contemporaneously transmitted to the application layer 14 with the completion packets.

Figure 3:
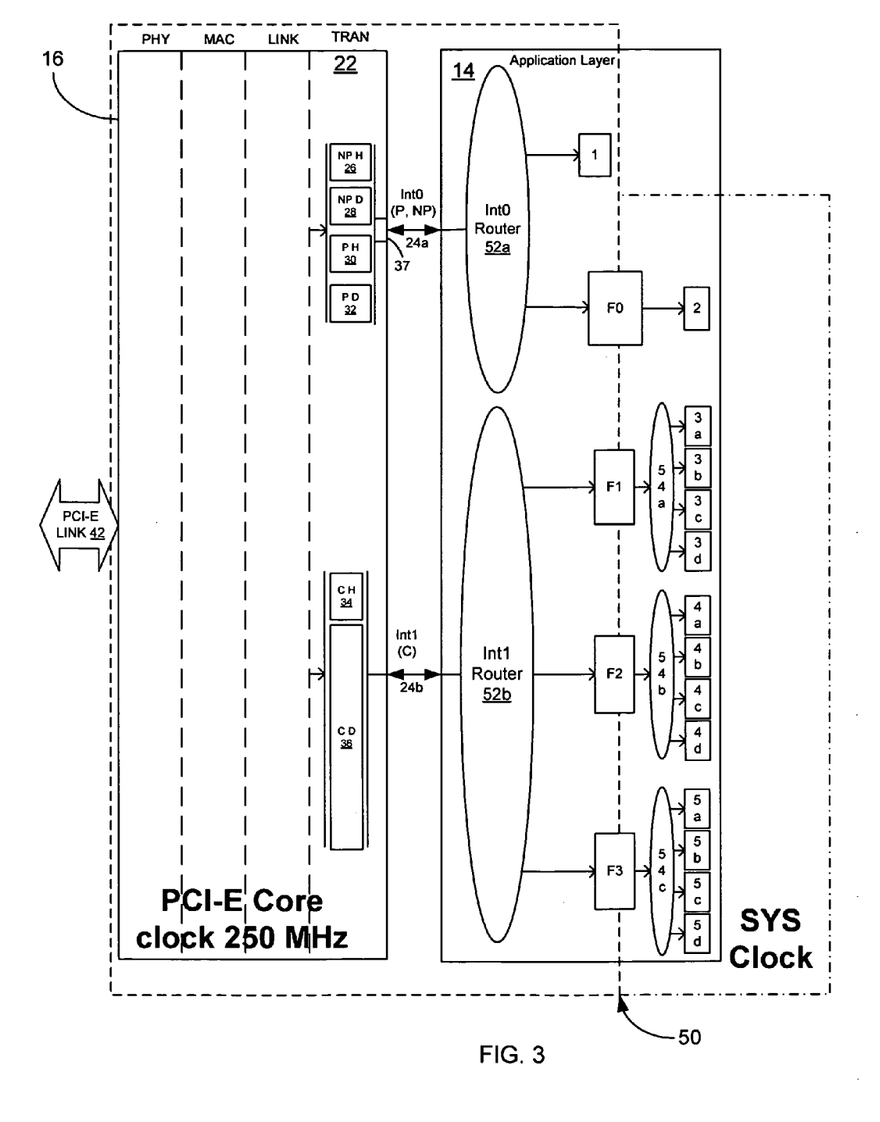
FIG. 3 is a schematic diagram of the data transfer system according to the present invention.

FIG. 3 is a schematic block diagram of the data transfer system 10 showing a more detailed view of the application layer 16. Shown in transaction layer 22 are non-posted buffers 26, 28, posted buffers 30, 32 and completion buffers 34, 36. Shown in application layer 16 is Int0 router 52a, which receives the posted and non-posted transfers from buffers 26, 28, 30, and 32 and transfers them to clients to which they are addressed. Clients 1 and 2 then carry out various functions with the received data transfers.

Int1 router 52b receives the completion transfers from buffers 34 and 36 and transfers them to clients 3a–3d, 4a–4d and 5a–5d. Clients 3a–3d receive the completion transfers through cut-through FIFO F1 and router 54a; clients 4a–4d receive the completion transfers through cut-through FIFO F2 and router 54b; and clients 5a–5d receive the completion transfers through cut-through FIFO F3 and router 54c.

In operation, completion transfers are transmitted from the PCI Express link 42 to the completion transfer buffers 34 for the completion header and 36 for the completion data. Buffers 34 and 36 are preferably store-and-forward buffers, in which a complete packet is stored in the buffer before it is transmitted out to its destination. While the packet is stored in the buffer, it is checked for errors and, if an error is found, the packet is discarded and resent by the host device 12. In the exemplary system shown in FIG. 3, each completion packet transfer may be transmitted to one of twelve clients, i.e., clients 3a–3d, clients 4a–4d and client 5a–5d. As described above, each set of four clients receives its completion packets through one cut-through FIFO, i.e., FIFO F1, FIFO F2 or FIFO F3. Therefore, completion packet transfers which are addressed to be transmitted to client 3a will be routed through FIFO F1 and then, through router 54a, to client 3a. Likewise, completion packet transfers which are addressed to be transmitted to client 5c will be routed through FIFO F3 and then, through router 54c, to client 5c.

In some instances, it is desirable to throttle the transmission of completion packets from the transaction layer 22 to the clients. In one instance, if the client to which completion packets are to be transferred is busy, and therefore is not able to receive completion packets, the transmission of the packets to the client is stalled until the client indicates that it is ready to resume its reception of completion packets. In this instance, and as described in detail below, the client will assert a WAIT signal to the cut-through FIFO with which it is associated, which will cause the packets to be stored in the cut-through FIFO. When the client is able to resume its reception of completion packets, it will deassert its WAIT signal to the FIFO, and the transfer of completion packets to the client will resume.

Another instance when it is desirable to throttle the transmission of completion packets from the transaction layer 22 to the clients is when the data crosses a clock domain between the completion buffers 34, 36 and the clients 3–5. For example, as shown in FIG. 3, the PCI Express core 16 operates at a clock frequency of 250 MHz, while the clients may run at a system clock frequency of approximately half of the core frequency. The clock crossing domain is shown by dashed line 50. Therefore, it is necessary to adjust the speed at which the data packets are being transmitted through the system, so that data is not lost because it could not be received by the client at a fast enough rate.

Figure 4:
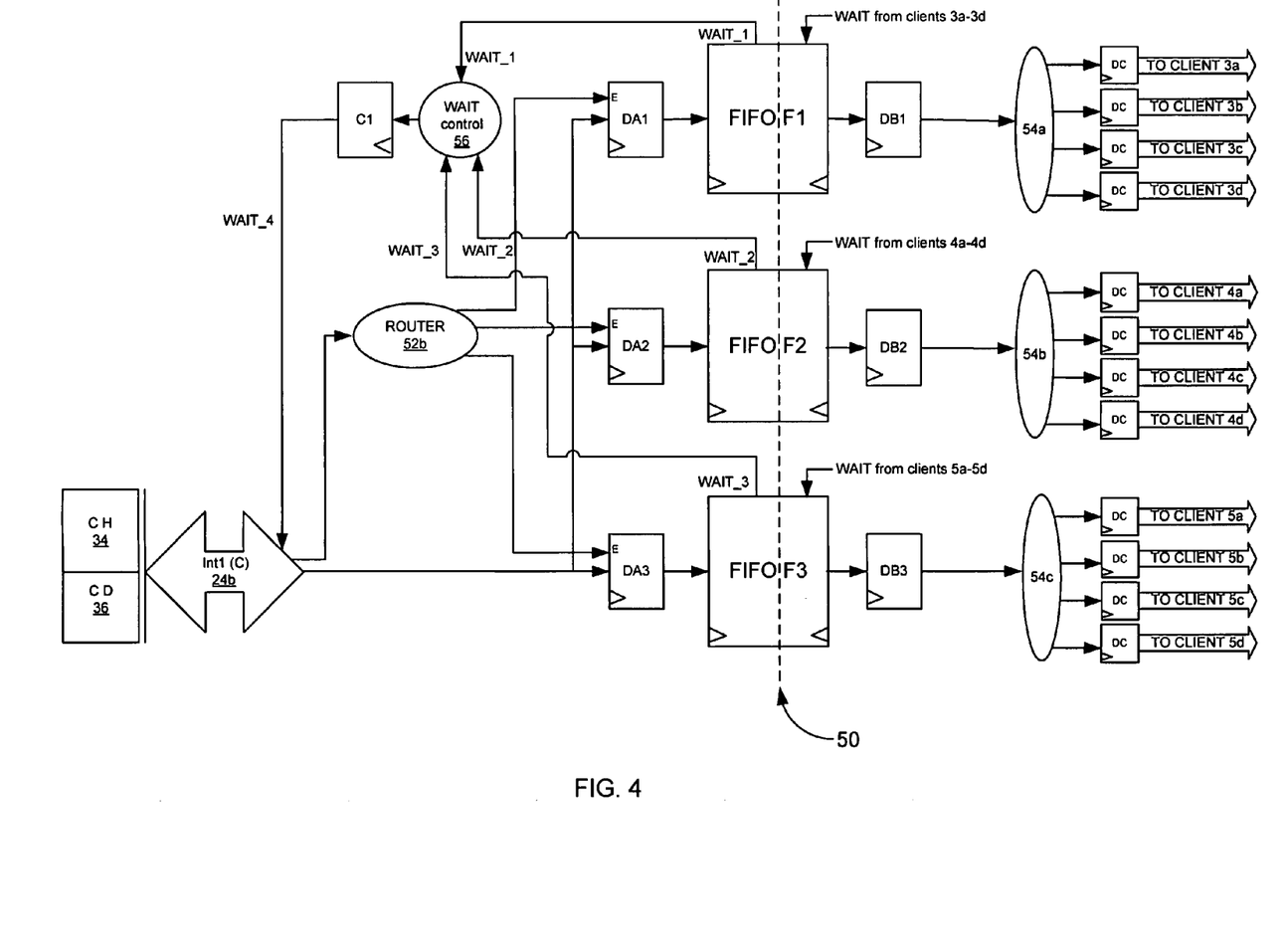
FIG. 4 is a schematic block diagram showing the completion transfer buffer device implemented within the application layer in accordance with the present invention.

Referring now to FIG. 4, which is a schematic block diagram showing, in greater detail, the path between the completion buffers 34 and 36 and the clients 3–5. Shown in FIG. 4 are cut-through FIFOs F1, F2 and F3, which receive completion packets from the application interface Int1 24b. The completion packets are input to registers DA1, DA2 and DA3 and the appropriate register is enabled by a signal from the router 52b, which receives the completion header portion of the packet. The data is clocked through the FIFO to one of switches 54a, 54b, 54c through an associated register DB1, DB2 and DB3, respectively. The completion packet is then transmitted by the router to the appropriate client. For example, if a completion packet is to be transferred to client 4b, the packet is transferred from the completion data packet buffer 36 through interface Int1 24b to each of registers DA1, DA2 and DA3. The router 52b, based on the address portion of the completion packet received from completion header buffer 34, outputs an enable signal to FIFO F2 to enable the data to be clocked through the FIFO F2.

However, as shown in FIG. 4, the FIFOs F1, F2 and F3 straddle the clock domain crossing 50. Therefore, the clients and components downstream of the line 50 are operating at a slower speed than the upstream components. In one embodiment, for example, the system clock frequency is approximately 125 MHz. This means that the data packets must be transferred out of the FIFOs at half of the frequency that they are being input to the FIFOs. For this reason, the FIFOs F1, F2 and F3 are cut-through-type buffers. A cut-through FIFO buffer is able to receive and store words that make up a packet, but can also begin transferring the words out of the buffer before the entire packet is stored. This enables the words of the packet to be input to the FIFO F2 at one frequency, 250 MHz, while they are transferred out of the FIFO F2 at a second, slower frequency, 125 MHz. This enables the client to synchronize the transfer of the words of the packets with the system clock.

The words of the completion packet are then transferred out of the FIFO F2, at the slower clock speed, to register DB2, and then to router 54b. Router 54b, based on the address to which the completion packet is being transferred, transfers the completion packet through the appropriate register DC to the client 4c.

In the event that one of the clients that is receiving completion packets from the associated FIFO becomes unable to receive packets, the client will assert a WAIT signal to the FIFO. In the example above, if client 4c is in the process of receiving completion packets, but needs to temporarily cease the transfer of completion packets for any reason, such as because the client needs to utilize its resources for other operations, the client 4c will assert a WAIT signal to the FIFO F2 to instruct the FIFO F2 to stop outputting words of the completion packets. Since the FIFO F2 is a cut-through buffer, however, it is able to continue receiving the completion packet words from the transaction layer 22 completion buffers 34 and 36. In this mode, the other clients 3a–3d and 5a–5d are able to receive packets through their respective FIFOs F1 and F3, but clients 4a, 4b and 4d will not be able to receive completion packets, as the FIFO F2 is no longer outputting packets to the router 54b. When the client 4c is again able to receive packets from the FIFO F2, it will deassert its WAIT signal, which will cause FIFO F2 to resume outputting completion packets to the router 54b.

If, however, the FIFO F2 were to become full before the client 4c deasserts its WAIT signal, the FIFO F2 will assert its own wait signal, WAIT_2, to a WAIT controller 56. WAIT controller includes logic which causes it to output a master wait signal WAIT_4 whenever one of the FIFOs F1, F2 and F3 assert their wait signals WAIT_1, WAIT_2 and WAIT_3, respectively. In one embodiment, WAIT controller 56 is an OR gate. Master wait signal WAIT_4 is output by the WAIT controller 56 and transmitted through a register C0 to the completion buffers 34 and 36 through the interface Int1 24b. The master wait signal WAIT_4 causes the store-and-forward buffers 34 and 36 to stop transferring completion packets through the interface Int1 24b to the application layer 16. The completion packets that are being transferred to the completion buffers 34 and 36 from the host device 12 will be stored in the completion buffers 34 and 36 until the master wait signal WAIT_4 is deasserted. In this situation, since the completion buffers 34 and 36 are storing all of the completion packets into thereto by the host device 12, none of the FIFOs F1, F2 and F3 will receive any completion packets, and, likewise, none of the clients will receive any completion packets, other than those that have already been stored in the FIFOs before the master wait signal WAIT_4 was asserted.

In this example, client 4c asserted its WAIT signal for a long enough period of time to cause FIFO F2 to fill, thus causing FIFO F2 to assert its wait signal WAIT_2. As a result, no further completion packets will be transferred from the completion buffers 34 and 36 to the application layer devices until the FIFO F2 deasserts its wait signal WAIT_2. In the meantime, however, when client 4c becomes able to resume receiving packets, it deasserts its WAIT signal, the words of the completion packets stored in FIFO F2 will resume being output from FIFO F2 to the router 54b and eventually to client 4c. As FIFO F2 outputs completion packets to switch 54b, it will begin to clear enough memory that it will be able to resume its receipt of completion packets from the completion buffers 34 and 36. Accordingly, the FIFO F2 will deassert its wait signal WAIT_2 to the WAIT controller 56, which will then deassert the master wait signal WAIT_4 to the completion buffers 34 and 36. This will cause the completion buffers 34 and 36 to resume outputting entire completion packets to the application layer devices over the interface Int1 24b.

Accordingly, the completion packet buffering system provides store-and-forward buffers 34 and 36 in transaction layer 22 for receiving the completion packets from the host device 12. Since the store-and-forward buffers stores each entire completion packet before transferring it upstream, the system is able to perform all the PCI Express required error checks, such as a CRC check, on each completion packet before they are transferred to the application layer devices. The completion packet buffering system also provides a number of cut-through FIFO buffers for both enabling the completion packets to cross from one clock domain to another and for enabling a client to which the completion packets are being transferred to temporarily cease the transmission of completion packets. In the event that one of the cut-through FIFO buffers becomes full, it is able to temporarily cease the transmission of completion packets from the store-and-forward buffers of the transaction layer 22.

Referring back to FIG. 3, as described earlier, non-posted and posted packet transfers occur through non-posted transfer header buffer 26, non-posted transfer data buffer 28, posted transfer header buffer 30 and posted transfer data buffer 32. In order to obtain the best possible latency for the data transfer system, it would be desirable to transfer the non-posted and posted packets directly to the application layer 14 without buffering. When these packets are stored in, for example, a store-and-forward buffer, the latency of the system suffers because, for every clock cycle that it takes to transfer a word into the buffer, another clock cycle is required to move the word out of the buffer. Therefore, a packet having 200 words would take 200 clock cycles to move the packet into the buffer and 200 clock cycles to move the packet out of the buffer, for a total of 400 clock cycles. In addition there would be a FIFO turn-on latency, which is latency from the time the last word is stored inside a FIFO until the first word is requested from the FIFO. Turn-on latency can represent a large portion of the overall FIFO latency in the case of the smaller packet sizes. If the packet was moved straight through to the application layer 14 without buffering, it would only take 200 clock cycles to move the packet to the application layer.

However, it can be desirable to buffer the packets being transferred from the transaction layer 22 to the application layer 14, particularly when the client to which the packets are being transferred are unable to receive the packets. In this case, if the packets are not buffered, they could be lost when they arrive at a client that is unable to accommodate the transfer of the packets.

Figure 5:
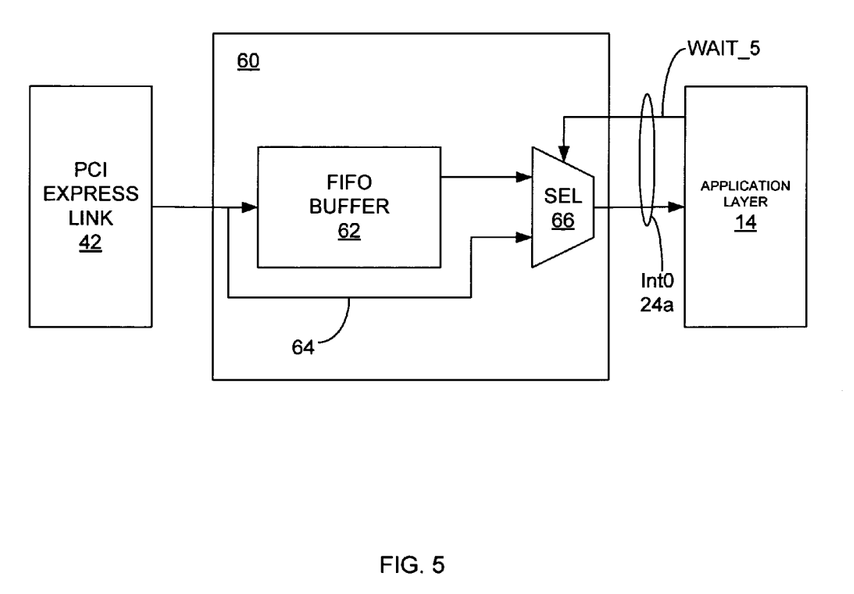
FIG. 5 is a schematic block diagram of the cut-through and bypass buffer device in accordance with the present invention.

FIG. 5 is a schematic block diagram of a buffer device 60 which enables packet transfers to be transmitted, in one instance, with the minimal possible latency when the target client is able to receive the packets and, in another instance, enables packets to be stored when the client is not able to receive the packets. However, the words of the packets are only stored for as long as is necessary until the client is able to receive the words. The words are transferred out of the buffer device 60 as soon as the client indicates that it is capable of receiving packets.

Each of the non-posted transfer buffers 26 and 28 and posted transfer buffers 30 and 32 are comprised of a buffer device 60. As shown in FIG. 5, buffer device 60 includes a FIFO buffer 62, which is a cut-through-type buffer, a bypass path 64 and a selection device 66. Buffer device 60 is capable of operating in two modes. In the bypass mode, packets are transferred from the host device 12 directly to the application layer 14 via the PCI Express link 42 and bypass path 64. The WAIT signal input to the selection device 66, as described below, is not asserted in the bypass mode. In this mode, the transfer of packets is as fast as possible, because they are not stored in the buffer 62 for any period of time.

In the cut-through mode of operation, when the WAIT signal is asserted by a client, the words of the packet being transferred are stored in the FIFO buffer 62 until the WAIT signal is deasserted. Since FIFO buffer 62 is a cut-through-type FIFO buffer, as soon as the WAIT signal is deasserted, the words stored in the buffer 62, as well as new words that are transferred into the FIFO buffer 62, are transferred out of the buffer to the application layer 14 through the selection device 66 and the interface Int0 24a. Furthermore, as new words are transferred into the FIFO buffer 62, they are clocked through the FIFO buffer 62 without being stored therein. As described above, the cut-through-type buffer does not store every word of a packet until the packet is complete before it transfers the packet out of the buffer.

Figure 6:
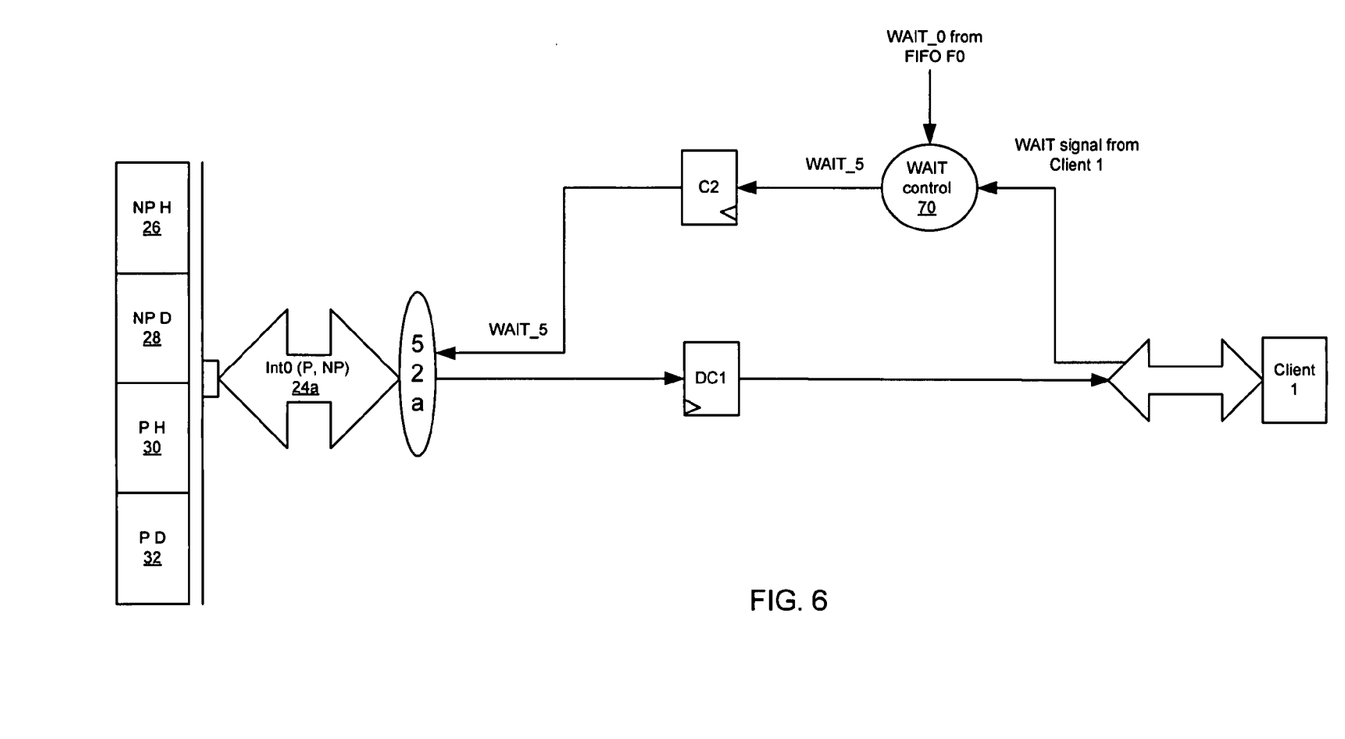
FIG. 6 is a schematic block diagram showing one implementation of the posted, non-posted transfer buffer device implemented within the application layer in accordance with the present invention.

Referring now to FIG. 6, the packet transfer path between the transaction layer non-posted and posted buffers 26–32 and client 1 will be described. As shown in FIG. 3, client 1 is connected directly router 52a and is operating at the same clock frequency as the PCI Express core 16. This enables the client 1 to receive the packet transfers as quickly as possible, without having to address the clock domain crossing issue. During a first mode of operation, the WAIT signal from client 1 is not asserted and data packets are transferred from the PCI Express link 42, through bypass path 64 and selection device 66 of buffer device 60 and onto the interface Int0 24a. After the router 52a determines that the packets are addressed to client 1 based on the header information in the packets, the packets are then clocked through a register DC1 to the client 1. In the event that client 1 must temporarily cease its reception of packet transfers, it will assert a WAIT signal to WAIT controller 70. As described below, WAIT controller 70 also receives a WAIT signal WAIT_0 from FIFO F0. In one embodiment, WAIT controller 70 is an OR gate. WAIT controller 70, upon receiving the WAIT signal from client 1, output a wait signal WAIT_5. The wait signal WAIT_5 is clocked through a register C1 and, via router 52a and interface Int0 24a, to a control input of selection device 66 of each of the buffer devices 60 of buffers 26–32. The assertion of the wait signal WAIT_5 stops the transmission of words of the packets on the bypass paths 64 of each buffer device 60 and causes the remaining words of packets currently being transferred from the buffers 26–32 to be stored in each of their FIFO buffers 62. As described above, as soon as the wait signal WAIT_5 from client 1 is asserted, the current word being transferred into buffer device 60 from the PCI Express link 42, and all words that follow the current word, are stored in FIFO buffer 62 until the wait signal WAIT_5 is deasserted.

When client 1 is ready to resume its reception of packet transfers, it deasserts its WAIT signal, causing the deassertion of wait signal WAIT_5 to the selection device 66. Upon the deassertion of the wait signal WAIT_5, the selection device 66 enables the words stored in the FIFO buffer 62 to be transferred to client 1 via interface Int0 24a and router 52a. As each word stored in the FIFO buffer 62 is clocked out of the FIFO buffer 62, the new words being transferred into buffer device 60 are clocked into the FIFO buffer 62, through the selection device 66 and to client 1 via interface Int0 24a and router 52a. The words will continue to be clocked through the FIFO buffer 62 until the transfer of packets through the buffer device 60 ends. When a packet transfer resumes, the packets will begin to be transferred to the application layer 14 via the bypass path 64. This operation will continue until one of the clients asserts its WAIT signal.

Figure 7:
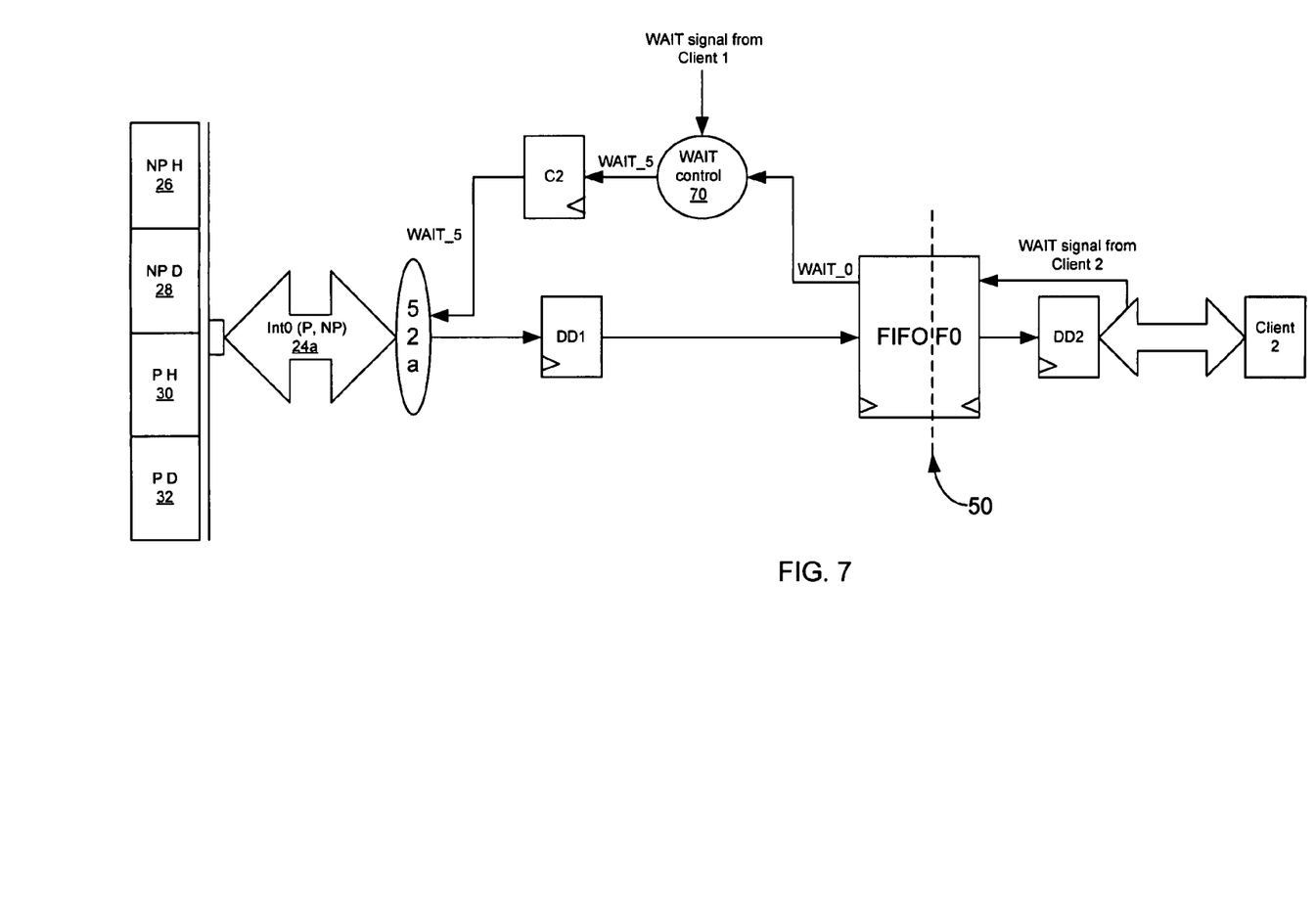
FIG. 7 is a schematic block diagram showing another implementation of the posted, non-posted transfer buffer device implemented within the application layer in accordance with the present invention.

FIG. 7 is a schematic diagram of the packet transfer path between the transaction layer non-posted and posted buffers 26–32 and client 2. As shown in FIG. 3, client 2 receives its packets transfers through FIFO F0, which straddles the clock domain crossing line 50. Therefore, when packets are transferred from the PCI Express core 16 to the client 2, it is necessary for the packets to be stored in the FIFO F0 for the purpose of enabling the packets to be output from the FIFO F0 at a rate that is slower than the rate at which the packets are transferred into the FIFO F0. This is a similar operation as the operation of FIFOs F1–F3, described above, except, for the purpose of error checking, FIFO F0 preferably is a store-and-forward FIFO. As described above, a store-and-forward buffer stores an entire packet before it transfers the packet upstream. While the entire packet is stored in the FIFO F0, an error check, such as a CRC check, is able to be performed on the packet. As described above, if an error is found in a packet, the entire packet is discarded and a new packet is sent. Since the non-posted and posted transfer packets were not stored in a store-and-forward buffer in the transaction layer 22, they have not yet been checked for errors. Accordingly, packets addressed to client 2 are checked for errors in FIFO F0. Regarding packets addressed to client 1, the speed of the transfer of the packets is a priority over error checking, so those packets are not checked for errors at this point in their transference.

Referring also to FIG. 5, during a first mode of operation, the WAIT signal from client 2 is not asserted and data packets are transferred from the PCI Express link 42, through bypass path 64 and selection device 66 of buffer device 60 and onto the interface Int0 24a. After the router 52a determines that the packets are addressed to client 2 based on the header information in the packets, the packets are then clocked through a register DD1 to the FIFO F0. The packets are then clocked through a register DD2 to the client 2. In the event that client 2 must temporarily cease its reception of packet transfers, it will assert a WAIT signal to FIFO F0. This will cause the FIFO F0 to store packets that it receives without forwarding packets to the client 2. When the client 2 deasserts its WAIT signal to the FIFO F0, the packets stored therein are able to be transferred out of the FIFO F0 to the client 2. However, if the FIFO F0 becomes full before the client 2 deasserts its WAIT signal, the FIFO F0 asserts its own wait signal WAIT_0 to WAIT controller 70, which transmits the wait signal WAIT_5 to the selection device 66 through a register C2 and over the interface Int0 24a.

As described above, the assertion of the wait signal WAIT_5 stops the transmission of words of the packets on the bypass paths 64 of each buffer device 60 and causes the remaining words of packets currently being transferred from the buffers 26–32 to be stored in each of their FIFO buffers 62. As soon as the wait signal WAIT_0 from FIFO F0 is asserted, the current word being transferred into buffer device 60 from the PCI Express link 42, and all words that follow the current word, are stored in FIFO buffer 62 until the wait signal WAIT_0 is deasserted.

When client 2 is ready to resume its reception of packet transfers, it deasserts its WAIT signal to the FIFO F0. Upon deassertion of the WAIT signal, the FIFO F0 begins transferring packets to the client 2. When the FIFO F0 has transferred enough packets out to client 2 and is ready to receive more packets from the transaction layer 16, it deasserts its wait signal WAIT_0 to the WAIT controller 70, which deasserts wait signal WAIT_5 to the selection device 66 through. Upon the deassertion of the wait signal WAIT_5, the selection device 66 enables the words stored in the FIFO buffer 62 to be transferred to client 2 via interface Int0 24a and router 52a. As each word stored in the FIFO buffer 62 is clocked out of the FIFO buffer 62, the new words being transferred into buffer device 60 are clocked into the FIFO buffer 62, through the selection device 66 and to client 1 via interface Int0 24a and router 52a. The words will continue to be clocked through the FIFO buffer 62 until the transfer of packets through the buffer device 60 ends. When a packet transfer resumes, the packets will begin to be transferred to the application layer 14 via the bypass path 64. This operation will continue until either client 1 asserts its WAIT signal or FIFO F0 asserts its wait signal WAIT_0, each resulting in the assertion of wait signal WAIT_5 from WAIT controller 70. As was described above with reference to FIG. 4 and wait signals WAIT_1, WAIT_2 and WAIT_3, when wait signal WAIT_5 is asserted, the transfer of non-posted and posted packets through all of buffers 26–32 is ceased, and neither client 1 or 2 receives packet transfers over the interface Int0 24a.

Figure 8:
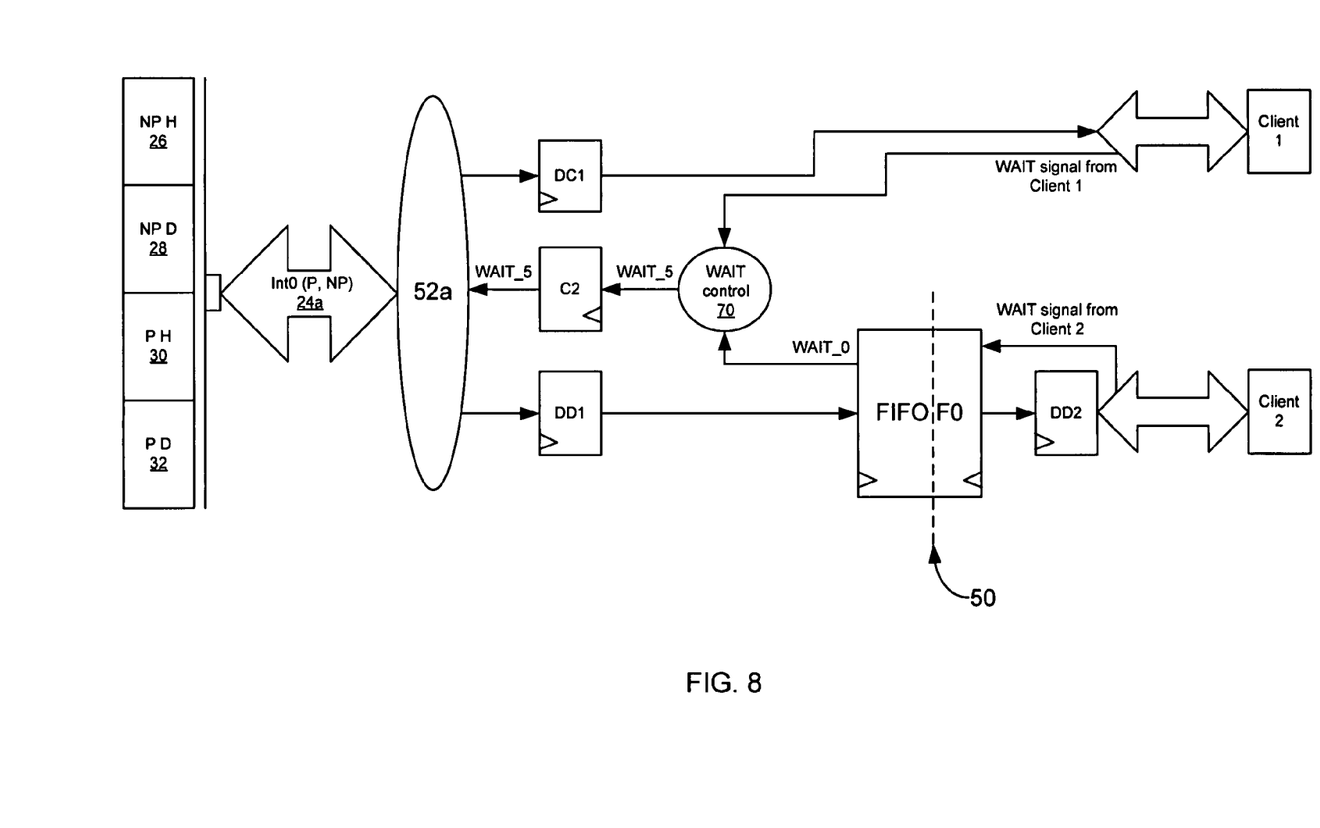
FIG. 8 is a schematic block diagram showing the combined implementations of the posted, non-posted transfer buffer device implemented within the application layer shown in FIG. 6 and FIG. 7 in accordance with the present invention.

FIG. 8 is a schematic diagram of the combined packet transfer paths between the transaction layer non-posted and posted buffers 26–32 and client 1 and client 2. As shown in FIG. 8, the WAIT signal from client 1 and the wait signal WAIT_0 from FIFO F0 are input to WAIT controller 70, which outputs wait signal WAIT_5 to the interface Int0 24a.

Accordingly, buffer device 60 enables non-posted and posted packet transfers to occur between the transaction layer 14 and the application layer 14 in two different modes. In a first mode, the data packets are transferred directly through the buffer device 60 without being stored for any period of time. This minimizes the number of clock cycles required to transfer the non-posted and posted packets to the clients to which the packets are addressed. In a second mode of operation, if client 1 or FIFO F0 is not capable of receiving packet transfers, the words of packets that were being transferred at the time are stored in the cut-through FIFO buffer 62 until client 1 or FIFO F0 are able to resume receiving packets. When client 1 or FIFO F0 are able to resume receiving packets, the words stored in the cut-through FIFO buffer 62 are transferred out of the buffer 62 to client 1 and/or FIFO F0. Furthermore, any words of packets that continue to be transferred from the PCI Express link 42 to client 1 and/or FIFO F0 will be transferred through the buffer 62 until that transfer of packets is completed. When a new transfer of packets begins, if client 1 and/or FIFO F0 are able to receive packets, the packets will be transfers via bypass path 64.

The buffer device 60 enables the data transfer system 10 to operate with minimal latency when possible and to protect packet transfers while operating at improved latency compared to prior art designs when the packet transfers must be throttled.

The system and method described herein may find applicability in any computing or processing environment. The system and method may be implemented in hardware, software, or a combination of the two. For example, the system and method may be implemented using circuitry, such as one or more of programmable logic (e.g., an ASIC), logic gates, a processor, and a memory.

The system and method may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system and method. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the data framer interface. The system and method also may be implemented as a machine-readable storage medium, configured with a computer program, where, upon execution, instructions in the computer program cause a machine to operate to perform the functions of the system and method described above.

Implementations of the system and method may be used in a variety of applications. Although the system and method is not limited in this respect, the system and method may be implemented with memory devices in microcontrollers, general-purpose microprocessors, digital signal processors (DSPs), reduced instruction-set computing (RISC), and complex instruction-set computing (CISC), among other electronic components.

Implementations of the system and method may also use integrated circuit blocks referred to as main memory, cache memory, or other types of memory that store electronic instructions to be executed by a microprocessor or store data that may be used in arithmetic operations.

The invention may be embodied in other specific forms without departing from the spirit or essential characteristics thereof. For example, the number of clients in the system; the number of clients associated with each FIFO; and the number of clients that are configured to receive completion, non-posted or posted packets transfers are arbitrary and therefore, any number or combination of these devices may be utilized with the invention.

Furthermore, while the invention is described as applying to the PCI Express protocol, it will be understood that the inventive concept of throttling completion packets as they are transferred to clients and providing a buffer device having a bypass path for one mode of operation of the system and a cut-through buffer for another mode of operation of the system may be applied to any data transfer system or protocol in which the ability to throttle the transfer of completion packets and/or providing an improved latency buffer device is desired.

The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A system for transferring packets between a packet transfer core and an application layer device over an application layer interface comprising:

a buffer system disposed in the packet transfer core having an input for receiving packets from a packet source; an output for transferring packets to the application layer interface; a buffer device having an input coupled to the input of the buffer system and an output; a selection device having a first input coupled to the output of the buffer device, a control input and an output coupled to the output of the buffer system; and a bypass path coupled between the input of the buffer system and a second input of the selection device;

wherein the control input of the selection device receives a first wait signal from the application layer device which is not asserted in a first mode of operation and asserted in a second mode of operation;

wherein, in the first mode of operation, packets are transferred from the input of the buffer system to the output of the buffer system via the bypass path and, in the second mode of operation, packets are transferred from the input of the buffer system to the buffer device, and are stored in the buffer device without being transferred to the output of the buffer system until the first wait signal from the application layer device is deasserted.

2. The system of claim 1 wherein, when system is in the second mode of operation and the first wait signal is deasserted, packets stored in the buffer device are transferred to the output of the buffer system through the selection device.

3. The system of claim 2 wherein, when system is in the second mode of operation and the first wait signal is deasserted, packets transferred to the buffer device from the input of the buffer system are no longer stored in the buffer device, but are transferred through the buffer device to the output of the buffer device and to the application layer interface through the selection device.

4. The system of claim 3 wherein the application layer device includes a wait controller which outputs the first wait signal based on at least one input thereto.

5. The system of claim 4 further including a first client which receives packets from the buffer system via the application layer interface, wherein, when the client is unable to receive packets from the application layer interface, the client inputs a second wait signal to the wait controller, causing the wait controller to assert the first wait signal to the selection device, which causes the buffer system to operate in the second mode of operation to continue receiving packets from the interface and storing the packets without transferring the packets to the application layer interface.

6. The system of claim 5 further including a second client coupled to the application layer interface through a register which receives packets from the buffer system through the application layer interface and transfers the packets to the second client.

7. The system of claim 6 wherein, when the second client is unable to receive packets from the register, the second client inputs a third wait signal to the register, causing the register to continue receiving packets from the application layer interface and storing the packets without transferring the packets to the second client; and wherein, when the register is unable to continue receiving packets from the application layer interface, the register asserts a fourth wait signal to the wait controller, causing the wait controller to assert the first wait signal to the selection device, which causes the buffer system to operate in the second mode of operation to continue receiving packets from the packet source and storing the packets in the buffer device without transferring the packets to the application layer interface.

8. The system of claim 4 further including a first client coupled to the application layer interface through a register which receives packets from the buffer system through the application layer interface and transfers the packets to the second client;

wherein, when the first client is unable to receive packets from the register, the first client inputs a second wait signal to the register, causing the register to continue receiving packets from the application layer interface and storing the packets without transferring the packets to the first client.

9. The system of claim 8 wherein, when the register is unable to continue receiving packets from the application layer interface, the register asserts a third wait signal to the wait controller, causing the wait controller to assert the first wait signal to the selection device, which causes the buffer system to operate in the second mode of operation to continue receiving packets from the packet source and storing the packets in the buffer device without transferring the packets to the application layer interface.

10. The system of claim 5 wherein, while the first wait signal is asserted, when the first client becomes able to receive packets, the first client deasserts the second wait signal, causing the wait controller to deassert the first wait signal.

11. The system of claim 9 wherein, while the second wait signal is asserted, when the first client becomes able to receive packets, the first client deasserts the second wait signal, causing the register to resume transferring packets stored therein to the first client; and when the register becomes able to receive packets, the register deasserts the third wait signal, causing the wait controller to deassert the first wait signal.

12. The system of claim 4 wherein the wait controller includes an OR gate.

13. The system of claim 1 wherein the buffer device includes a cut-through buffer.

14. The system of claim 9 wherein the register includes a store-and-forward, first-in, first-out (FIFO) buffer.

* * * * *